United States Patent [19]
Gassert

[11] 3,884,513
[45] May 20, 1975

[54] COUPLING FOR A PIPE OR TUBE

[75] Inventor: Willy Gassert, Solothurn, Switzerland

[73] Assignee: Societe Legris France, S.A., Ozoir-la-Feffiere, France

[22] Filed: Jan. 17, 1974

[21] Appl. No.: 434,273

[30] Foreign Application Priority Data
Jan. 31, 1973  Switzerland.......................... 1350/73

[52] U.S. Cl. ............................................. 285/322
[51] Int. Cl. ............................................. F16l 21/06
[58] Field of Search ........... 285/315, 316, 323, 257, 285/382.7, 382, 322; 403/368, 369, 371

[56] References Cited
UNITED STATES PATENTS

| | | | |
|---|---|---|---|
| 2,784,987 | 3/1957 | Corcoran......................... | 285/322 X |
| 3,186,740 | 6/1965 | Lee.................................. | 285/323 X |
| 3,454,290 | 7/1969 | Tairraz............................ | 285/323 X |
| 3,653,689 | 4/1972 | Sapy et al. ...................... | 285/322 X |
| 3,687,494 | 8/1972 | Graff............................... | 285/382.7 X |
| 3,743,326 | 7/1973 | Courtot et al. ................. | 285/323 X |

*Primary Examiner*—Geo. V. Larkin
*Attorney, Agent, or Firm*—Stevens, Davis, Miller & Mosher

[57] ABSTRACT

This invention relates to a coupling for a pipe or tube. The present coupling includes a first member having clamping jaws thereon for engaging a pipe or tube and a second member which slides over the first member to clamp the jaws on the tube or pipe.

10 Claims, 2 Drawing Figures

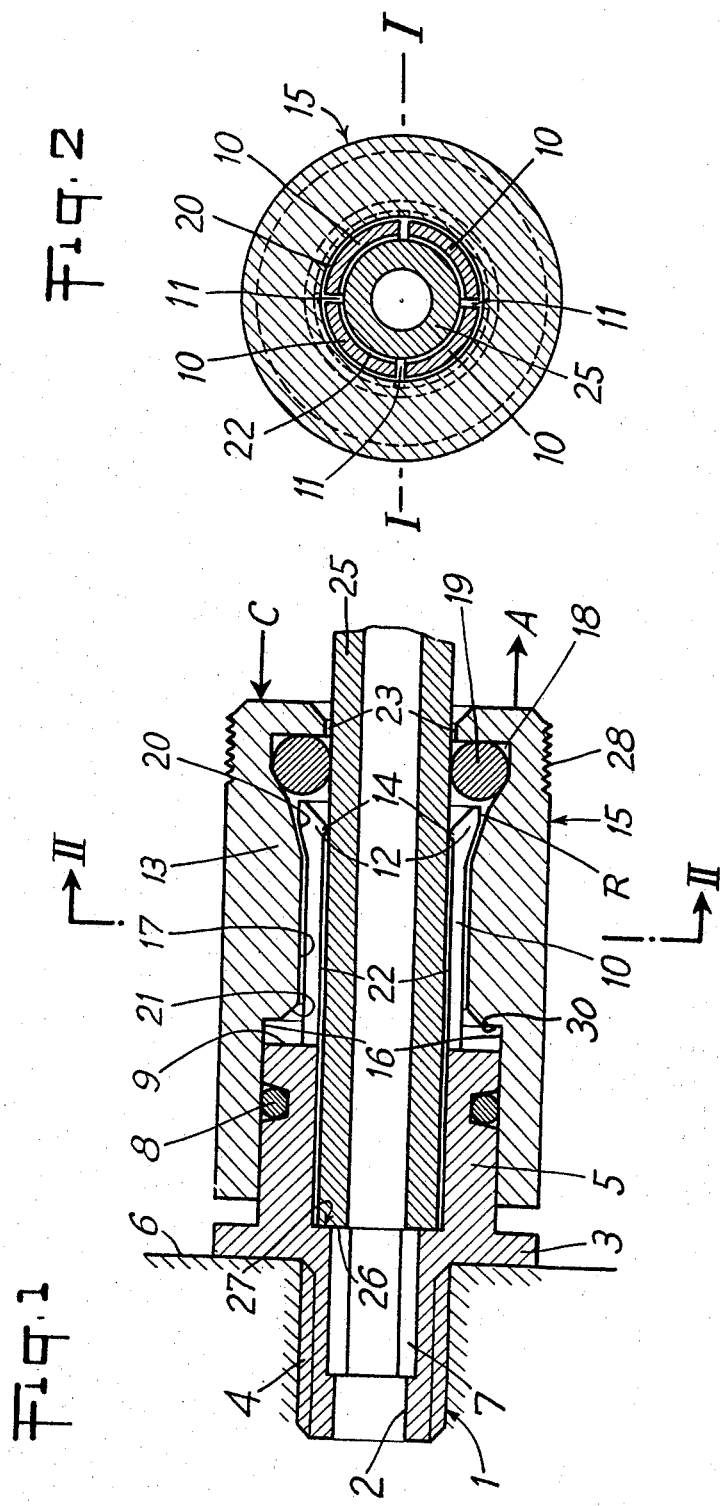

COUPLING FOR A PIPE OR TUBE

The present invention relates to a coupling and more especially to a coupling having a quick fit action for a flexible pipe or a rigid tube. Quick couplings of this type are used in pneumatic or hydraulic installations.

In addition to being leakproof, these couplings must be very easy to assemble and dismantle by hand. It is difficult to achieve this ease especially in applications in which several quick couplings are mounted very close to one another, because of the difficulty in gaining access.

According to the present invention there is provided a coupling for a pipe or tube comprising a first member having an axial passage and clamping jaws projecting axially beyond one end of the passage, and a second member which is adapted to slide over the first member to clamp the jaws over the periphery of the tube or pipe.

In a preferred embodiment the second member comprises a sleeve which fits closely over these jaws and, at one of the ends of its opening, has a cavity intended to receive the free ends of the jaws, the latter being elastic and shaped in such a way that, in the expanded state, they have a diameter greater than that of the sleeve and can cooperate with a shoulder of the hollow.

The shoulder can be conical so that an axial force exerted on the sleeve, in the direction in which it would be removed, clamps the jaws more tightly in the radial direction over the outer surface of the pipe.

An illustrative embodiment of the present invention will now be described with reference to the accompanying drawing, in which:

FIG. 1 is a longitudinal cross-section along the line I—I of FIG. 2 of one form of coupling; and FIG. 2 is a cross-section along the line II—II of FIG. 1.

The coupling shown in the drawings comprises a first member 1 bored with an axial opening 2. Approximately half way along the first member 1 is positioned an integral annular flange 3, on one face of which a threaded extension 4 projects, while an integral socket 5 projects on the other face. The first member 1 is attached to a pneumatic apparatus by screwing its threaded extension 4 into a bore in a wall 6 of the main body of the apparatus. In order to screw this extension in position, a male key is driven into a segment 7, which possesses a hexagonal cavity, of the axial opening 2. On its outer periphery, the socket 5 possesses an annular groove intended to receive a toroid ring 8. Four clamping jaws 10 project from the free end 9 of the socket, these clamping jaws being integral with socket member 5 and evenly distributed around the circumference in a ring and being separated from one another by axial slits 11 (FIG. 2). The free ends 12 of the jaws flare outwards with a conical profile, as indicated at 13. On their internal surface, the free ends of the jaws 10 possess prongs 14.

A sleeve 15 is slipped over the jaws 10, the sleeve having, at one of its ends, a counter-bore 16 which fits over the socket 5; the joint between this socket and the counter-bore is sealed hermetically by the toroid ring 8. After the counter-bore 16, the sleeve has a bore 17 of smaller diameter. The diameter of bore 17 is increased at the other end to provide an enlarged portion 18 which receives a toroid ring 19 and has a conical shoulder 20 corresponding to the conical widening 13 of the jaws 10. This shoulder 20 forms the transition between the enlarged portion 18 and the bore 17 of the sleeve 15. In order to make it easier to introduce the clamping jaws 10 into the bore 17, the sleeve has an inlet chamfer 21 at its fitting end.

A common bore 22 passes through the socket 5 and the clamping jaws 10. Likewise, at its end which follows the enlarged portion 18, the sleeve 15 has a bore 23 of diameter almost the same as that of the bore 22. The bores 22 and 23 receive, with clearance, the end of a tube or pipe, for example a plastic tube 25, the free end 26 of which is pressed against a radial shoulder 27 formed at the foot of the bore 22.

The coupling described above is assembled as follows:

First of all, the first member 1 is screwed into the bore of the wall 6. Thereafter, the end on the side of the counter-bore 16 of the sleeve 15 is pushed against the clamping jaws, so that the latter slide first on the chamfer 21 and then close up inwards so that they can enter the bore 17 of the sleeve. As illustrated in FIG. 1, slits 11 extend from end 9 of socket 5 to the opposite end of jaws 10. The width of the slits 11 provided between the jaws 10 and the length of the slits are calculated so that, in the entirely compressed state, that is to say the state in which the slits 11 are close together, the jaws have an external diameter at their free end 12 which is less than the diameter of the bore 17. The bore 17 of the sleeve can thus slide over the free ends 12 of the jaws 10 until these ends 12 enter the enlarged portion or cavity 18 which contains the toroid ring 19, and they move apart again in this enlarged portion 18 to be locked behind the conical shoulder 20 of the sleeve 15.

The dimensions of the elements are calculated so that, in the just described position, the foot of the counter-bore 16 of the sleeve 15 is at a certain distance from the end radial surface 9 of the socket 5, from which the jaws 10 project, but so that the inner surface of the counter-bore 16 of the sleeve 15 covers the outer periphery of the socket 5 already extending beyond the toroid ring 8 and thus establishing a leakproof joint between the socket 5 and the sleeve 15. When the sleeve 15 is fitted over the jaws 10, the latter scored the bore 17 slightly because of the elastic force which tends to move them apart radially, thus making it more difficult to pull the sleeve 15 away from the socket 5 of the first member 1.

It is now possible to push the tube or pipe through the bore 23 of the sleeve 15 and through the bore 22 of the clamping jaws 10 and the socket 5 until it rests against the radial shoulder 27. The only resistance which has to be overcome for this maneuvre is that which is set up by the toroid ring 19. The prongs 14 do not set up any resistance to the pushing in of the tube or pipe because, in their opened out or expanded position, the free ends 12 of the jaws do not project into a zone situated radially on the inside relative to the outer periphery of the pipe 25. As long as the pipe 25 is under zero pressure, it is thus held in the quick coupling only by friction on the toroid ring 19. On the other hand, when the pipe is pressurized, the fluid seeps between the free end 26 of the pipe 25 and the radial shoulder 27 formed at the foot of the bore 22, and enters the region between the pipe 25 and the sleeve 15 in which the jaws 10 are located. This pressure is exerted on the sleeve 15, acting on one side of the foot 30 of the counter-bore and on the other side on the toroid ring, thus tending to move the sleeve away from the socket 5, in the direction of the arrow A, until the conical shoulder 20 of the sleeve 15 comes to rest on the conical outer surfaces 13 of the free ends 12 of the clamping jaws. The effect of this is to cause the prongs 14 of the jaws 10 to bite into the outer surface of the pipe 25, without however the jaws closing up to the extent that the bore 17 can slide over the external diameter 12 of their free ends. On the other hand, the conical outer surfaces 13 of the clamping jaws rest against the shoulder 20, so that the sleeve 15 is held axially by the jaws 10. The greater the pressure, the more the prongs 14 bite into the outer surface of the tube. In order to remove the pipe or tube 25, the pressure inside it must first be reduced to zero. Thereafter, two fingers, for example the thumb and the index finger, are slid along the tube and the sleeve 15 is pushed in the direction of the arrow C. Under this thrust, the free ends 12 of the jaws 10 free themselves from the conical shoulder 20 of the sleeve 15 so that, due to their elasticity, they can now return to their expanded position and can release their prongs from the outer surface of the pipe. It is now possible to dismantle the pipe 25 without difficulty, and without this pipe dragging the sleeve 15 in the direction of the arrow A, due to the toroid ring 19. During this removal, the sleeve 15 is held by the toroid ring 8. By choosing the characteristics of the elements, for example so that the toroid ring is greatly compressed in its groove, it is possible to make the force which tends to hold the sleeve in position have a higher value than the dragging effect exerted on the sleeve by the pipe via the toroid ring 19. In this case, the sleeve 15 does not have to be held in the axial direction in order to remove the tube 25.

The cone angle of the conical outer surfaces 13 of the jaws 10 and of the conical shoulder 20 of the sleeve 15 is preferably less than the friction angle, so that the conical surfaces 13 can cooperate with the conical shoulder 20, so that they develop a self-locking effect and so that they can be separated from one another, in the direction of the arrow C, only under the effect of an external force. This guarantees that the prongs 14 of the jaws 10 remain pressed tightly against the outer surface of the pipe 25 as long as an external pressure in the direction of the arrow C has not been exerted on the sleeve 15. This is advantageous for safety reasons.

If the quick coupling is used for a vacuum pipeline, the pipe 25 is held by the toroid ring 19. If the quick coupling is used to transmit a reduction in pressure, the sleeve 15 cannot travel spontaneously in the direction of the arrow A. For this case, the sleeve 15 can be equipped with a milled zone 28 which the person assembling the apparatus can grip between two fingers in order to exert a pulling force in the direction of the arrow A, so as to press the prongs 14 onto the outer surface of the pipe 25. This only constitutes an additional safety measure which is not absolutely necessary. In fact, if the internal pressure increases, the pipe 25 runs absolutely no risk of being ejected from the bores 22 and 23. In fact this pressure always acts on the foot 30 of the counter-bore 16 and on the toroid ring 19 with a greater force than on the free end surface 26 of the pipe 25 and thus causes the jaws 10 to be tightened by the sleeve 15. This sleeve 15 will thus always travel in the direction of the arrow A before the pipe 25 travels in the same direction relative to the toroid ring 19.

We claim:

1. A coupling for a pipe or tube comprising a first member having an axial passage therethrough, a second member slidably disposed over the first member and having an axial passage therethrough, circumferentially spaced flexible clamping jaws disposed around the wall of the passage of the second member and secured at one end to said first member and terminating in opposite free ends, said clamping jaws being so disposed that said slidable member presses the free ends thereof radially inwardly when moved to its extreme position over the first member and releases the clamping jaws to permit radial expansion thereof when disposed away from the said extreme position.

2. A coupling according to claim 1, in which said second member is in the form of a sleeve and includes means defining a cavity for receiving the free ends of the jaws which are resilient and in their expanded state have a diameter greater than the internal diameter of the sleeve, and a shoulder, said shoulder being provided in the cavity of the sleeve and being adapted to cooperate with the jaws.

3. A coupling according to claim 2, in which said shoulder is conical and is adapted to cooperate with the free ends of the jaws to close the jaws radially against the outer surface of a tube or pipe under the effect of an axial force exerted on the sleeve in the direction tending to remove the latter.

4. A coupling according to claim 3, in which the free ends of said jaws and said conical shoulder have the same cone angle so that the jaws and the shoulder cooperate to produce a self-locking effect.

5. A coupling according to claim 2, in which the jaws can be closed together to allow the sleeve to be mounted thereon.

6. A coupling according to claim 2, which includes a sealing ring, said sealing ring being located in the cavity to seal the coupling to the pipe or tube.

7. A coupling according to claim 1, in which the first member includes a socket over which the second member can be mounted in a sealed manner.

8. A coupling according to claim 1, which includes four clamping jaws having radially extending prongs at their free ends.

9. A coupling for a pipe comprising a first member having an axial bore extending inwardly from a first end thereof and a counterbore of larger cross-section extending inwardly from the opposite end thereof, a second member slidably disposed about said first member with the first member inserted in a first bore in the second member which is coaxial with the counterbore in the first member, a second bore in the second member extending from the internal end of the first bore to a point spaced from the opposite end of the second member, said second bore being of uniform cross-section larger in cross-section than the counterbore in the first member and smaller than the cross-section of said first bore in the second member, a counterbore beginning at said opposite end of the second member and stopping at a point spaced longitudinally from the said point where the said second bore stops, and a third bore between the second bore and counterbore in the second member of larger cross-section than that of the second bore and providing an annular seat for a toroid ring next to the said counterbore and having a wall which slopes radially outwardly from the point where the second bore stops to said seat forming a frusto-conically shaped portion, a toroidal shaped ring disposed in said seat, and circumferentially spaced flexible clamping jaws disposed about the wall of said second bore secured at one end to the first member and terminating in end members free to move radially and disposed in the said frusto-conically shaped portion, said end member having a surface adjacent to the sloping surface of the said frusto-conically shaped portion which is substantially parallel thereto and an opposite side having a means adapted to engage a pipe disposed between the jaws, said counterbore in the first member, said toroid ring and said counterbore in second member providing supporting surfaces for a pipe disposed through the counterbore and second bore in the second member and in the counterbore of the first member, whereby said second member presses said jaws radially inwardly when moved longitudinally against said end members and releases said end members for radial expansion of the jaws when moved longitudinally away from the end members.

10. The coupling of claim 9 wherein said first member has a socket member over which said second member slides and an external annular flange integral with the socket and positioned to stop movement of the second member thereover.

* * * * *